(12) United States Patent
Chabot et al.

(10) Patent No.: US 11,576,312 B2
(45) Date of Patent: Feb. 14, 2023

(54) SAP COLLECTION SYSTEM AND SAP LIFTER THEREFOR

(71) Applicant: Les Equipements D'Erabliere C.D.L. Inc, Saint-Lazare-de-Bellechasse (CA)

(72) Inventors: Marc-Andre Chabot, Saint-Damien-de-Buckland (CA); Martin Chabot, Sainte-Claire (CA)

(73) Assignee: LES EQUIPEMENTS D'ERABLIERE C.D.L. INC, Saint-Lazare-de-Bellechasse (CA)

(*) Notice: Subject to any disclaimer, the term of this patent is extended or adjusted under 35 U.S.C. 154(b) by 0 days.

(21) Appl. No.: 17/318,010

(22) Filed: May 12, 2021

(65) Prior Publication Data
US 2021/0352861 A1 Nov. 18, 2021

Related U.S. Application Data

(60) Provisional application No. 63/024,075, filed on May 13, 2020.

(51) Int. Cl.
*A01G 23/14* (2006.01)

(52) U.S. Cl.
CPC .................................... *A01G 23/14* (2013.01)

(58) Field of Classification Search
USPC ..... 47/11, 10, 12, 50, 51, 52, 53, 54, 58.1 R
See application file for complete search history.

(56) References Cited

U.S. PATENT DOCUMENTS

| 2,552,681 | A | * | 5/1951 | Lang | ............ | F04D 3/005 |
| | | | | | | 416/223 R |
| 2,958,158 | A | * | 11/1960 | Hatton | .......... | A01G 23/14 |
| | | | | | | 47/52 |
| 5,224,289 | A | * | 7/1993 | Buzzell | ............ | A01G 23/14 |
| | | | | | | 285/361 |
| 6,988,332 | B2 | * | 1/2006 | Harvey | ............ | A01G 23/10 |
| | | | | | | 47/10 |

FOREIGN PATENT DOCUMENTS

| CA | 1098720 | * | 4/1981 | ............ | A01G 23/10 |
| CA | 3044919 | * | 11/2019 | ............ | A01G 23/10 |
| CN | 104445462 | * | 3/2015 | | |
| CN | 208348106 | * | 1/2019 | ............ | F04D 13/08 |

OTHER PUBLICATIONS

Electric Sap Releaser posted by Chad Sharrow one YouTube, Dec. 12, 2016, [retrieved from internet May 31, 2022 https://youtu.be/0loh-tN7c_E] 2 pages.*

* cited by examiner

*Primary Examiner* — Andrea M Valenti
(74) *Attorney, Agent, or Firm* — Snyder, Clark, Lesch & Chung, LLP

(57) ABSTRACT

The present invention generally related to a maple sap lifter configuration and to a sap collection system making use of the sap lifter. The system includes a vacuum pump, a number of pipes, and the sap lifter. The sap lifter includes a body; an inlet for conveying sap towards the sap lifter; a first outlet for conveying the sap away from the sap lifter; and a pump operatively coupled to the pipes and adapted to pump the sap away from the body once a maximum level of sap is reached, and wherein the maximum level of sap is set to leave an air space in the body and in the pipes for maintaining the level of constant vacuum. The sap lifter and the pipes alternatively define a closed-circuit with no fluid communication with ambient air for maintaining the level of constant vacuum.

20 Claims, 5 Drawing Sheets

SAP COLLECTION SYSTEM AND SAP LIFTER THEREFOR

CROSS REFERENCE TO RELATED APPLICATION

This application claims priority under 35 U.S.C. § 119 based on U.S. Provisional Application No. 63/024,075, filed May 13, 2020, the contents of which are hereby incorporated by reference herein.

TECHNICAL FIELD

The invention relates to a sap collection system and to a sap lifter therefor.

BACKGROUND OF THE ART

The maple syrup industry which has produced maple syrup in an artisanal way for a hundred years until the 1960s has undergone transformation towards industrialization in order to initiate an increase in production performance and lower production costs which became prohibitive.

The classical way of harvesting sap was using buckets hanging from the trees. Thereafter, each bucket was to be emptied one by one into a large container, which was pulled by a horse or tractor into the sugar bush. Subsequently, the sap from the large container was sent to the sugar shack in order to be boiled using an evaporator to obtain a 66% brix sugar maple syrup. The main problem with the classical way of collecting maple sap was that maple growers were unable to expand their business due to the huge workload required to harvest sap from trees. As a result, profitability of maple syrup productions was almost impossible to reach.

In the 70s, an alternative method of collecting maple sap was developed. This alternative way involved collecting the sap from the maple trees using a tubing system, much the same way as in the dairy industry. This collection method was made possible thanks to a network of tubing and lines permanently installed on the entire sugar bush area, where the sap of each of the maple trees is conveyed to a pumping station, which is then routed to the main sugar shack to be transformed into maple syrup. Since they did not require a human presence as extensive as the classical bucket method, map sap collection systems allowed maple producers to significantly expand their businesses and make them much more profitable.

Using these systems, maple sap harvesting is possible thanks to the network of tubing, which can be under vacuum or not. In most instances, the sap is collected from the maple tree into a tube, and descends by gravity to the pumping or harvesting station, thanks to the tubing being installed according to a downward slope in the area. However, and referring to FIG. 1, the topography of the land does not always provide for a suitable downward slope towards the pumping or harvesting station. For instance, the topography of the land may involve valleys in which tubing or mainlines are installed partially in an upwardly extending direction, thus preventing the maple sap to flow toward the collecting or harvesting station by relying on gravity, as best shown in FIG. 1.

Different systems have thus been envisaged to allow the harvesting of the sap in places where topography does not allow gravity or a downward slope towards the pumping or harvesting station. All of these systems involve tubing conveying maple sap from higher points to a tank located in the lower portion of the land (e.g. at the bottom of a valley), and then use vacuum to draw the maple sap up from this tank located at the lower portion of the land to another fairly high level, to then allow the sap to flow by gravity from this high level to the pumping or harvesting station.

Although the existing systems may prove useful, they suffer a number of drawbacks. The first problem of the current systems is that vacuum leaks tend to occur in the tubing network each time in order to create the desired suction, this in order to allow the water to be sucked to a more topographic level. By the same token, each time, these said systems create a loss of performance due to this loss of vacuum caused, sudden in the network of tubing. This is problematic since the higher and more constant the vacuum, the higher the yield or harvest of sap are.

The second problem with the current systems is that they all tend to be very vulnerable to freezing due to the venturi effect. Indeed, when a vacuum leak is created in the system in order to suck up the maple sap, the vacuum leak creates this venture effect which in turn translates into an accumulation of ice affecting the functioning of these systems, even in a places where the temperature is above freezing point.

Therefore, it would thus be desirable to be provided with a sap collection system that alleviate at least some of the above-identified drawbacks.

SUMMARY

According to a broad aspect, there is provided a sap lifter for a sap collection system. In this broad aspect the sap lifter comprises:
  a body having an exterior and defining an internal cavity;
  an inlet configured for sealingly connecting a downstream end of a first mainline portion to the body, the first mainline conveying sap towards the sap lifter;
  an auxiliary outlet configured for sealingly connecting an auxiliary tube to an upstream end of a second mainline portion, the second mainline portion conveying the sap away from the sap lifter;
  a first pipe having a first end extending in the internal cavity of the body to collect maple sap and a second end located outside the body, the second end of the first pipe being connectable the upstream end of the second mainline portion;
  a pump operatively coupled to the first pipe, the pump being operable to pump the maple sap from the first end of the first pipe to the second end of the first pipe once a maximum level is reached in the body, the maximum level being set to leave an air space in the body, the air space allowing a vacuum created in the second mainline and the auxiliary tube to continue in the first mainline portion.

In one feature, the sap lifter further comprises a cover mounted to the body. Preferably, the cover is a removable cover. Preferably, the removable cover is secured to the body using at least one clamp.

In another feature, at least one of the cover and the body is provided with a seal located between the removable cover and the body when the removable cover is mounted to the body.

In yet another feature, the sap lifter further comprises a gauge mounted to the body for monitoring a vacuum pressure in the sap lifter.

In an additional feature, the pump comprises a submersible pump.

In still an additional feature, the sap lifter further comprises a switch for powering the pump when a desired level of sap is accumulated in the internal cavity. In one feature, the switch is a float switch.

In a further feature, the pump is an electric pump. Preferably, the electric pump is connected to an electric source, and more preferably the electric source is at least one electric source selected from a group consisting of a battery and a solar panel system.

In another broad aspect, there is provided a sap collection system comprising a sap lifter as described above.

In one feature, the sap collection system comprises a maple sap collection system.

In another feature, the sap collection system comprises a sap collection system under vacuum. In this feature, the sap collection system under vacuum comprises a sap collection system under low vacuum or a sap collection system under high vacuum.

BRIEF DESCRIPTION OF THE DRAWINGS

Having thus generally described the nature of the invention, reference will now be made to the accompanying drawings, showing by way of illustration example embodiments thereof and in which.

DETAILED DESCRIPTION

According to one embodiment, there is provided an autonomous sap collection system 10 that alleviates at least some of the drawbacks generally associated with the sap collection system of the prior art. In one embodiment, the sap collection system 10 is maple sap collection system, although it will be understood that it could be used to collect sap from other types of trees, including for instance birch sap. In other embodiments, the sap collection system 10 could be used for achieving different purposes, for instance to convey water collected from a spring to another area of a land where the topography would not allow spring water to flow through a line or pipe simply by the effect of gravity. As such, the term "sap" as intended herein should be interpreted broadly so as to include any liquid for which the system 10 may find use.

In one embodiment, the system 10 is powered by solar energy and allows harvesting at high or low level of vacuum the sap of trees in places whose harvesting by standard gravity under vacuum or not is not possible until the pumping station.

Figure 1:
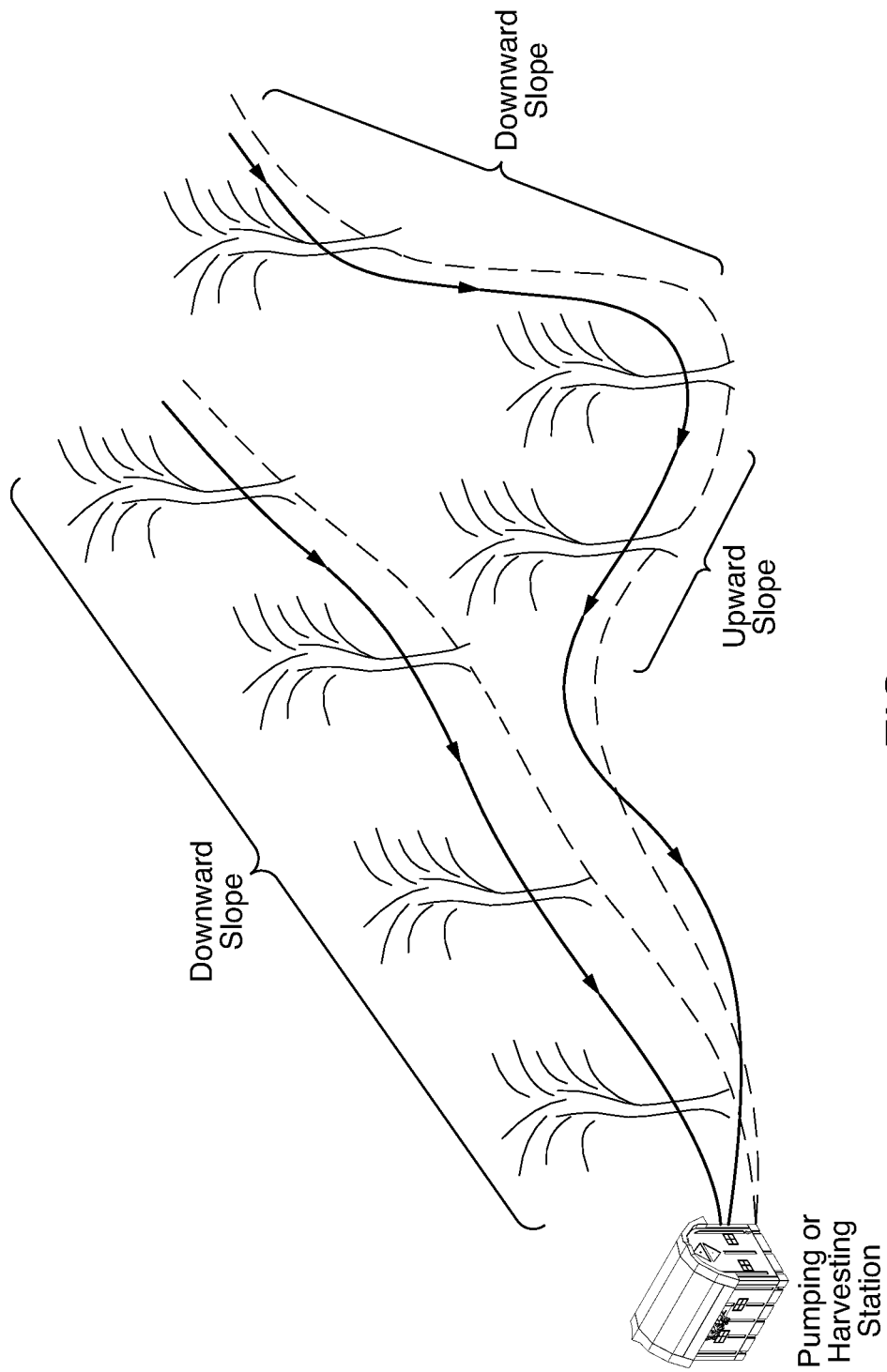
FIG. 1 shows a sap collection system of the prior art.
Figure 2:
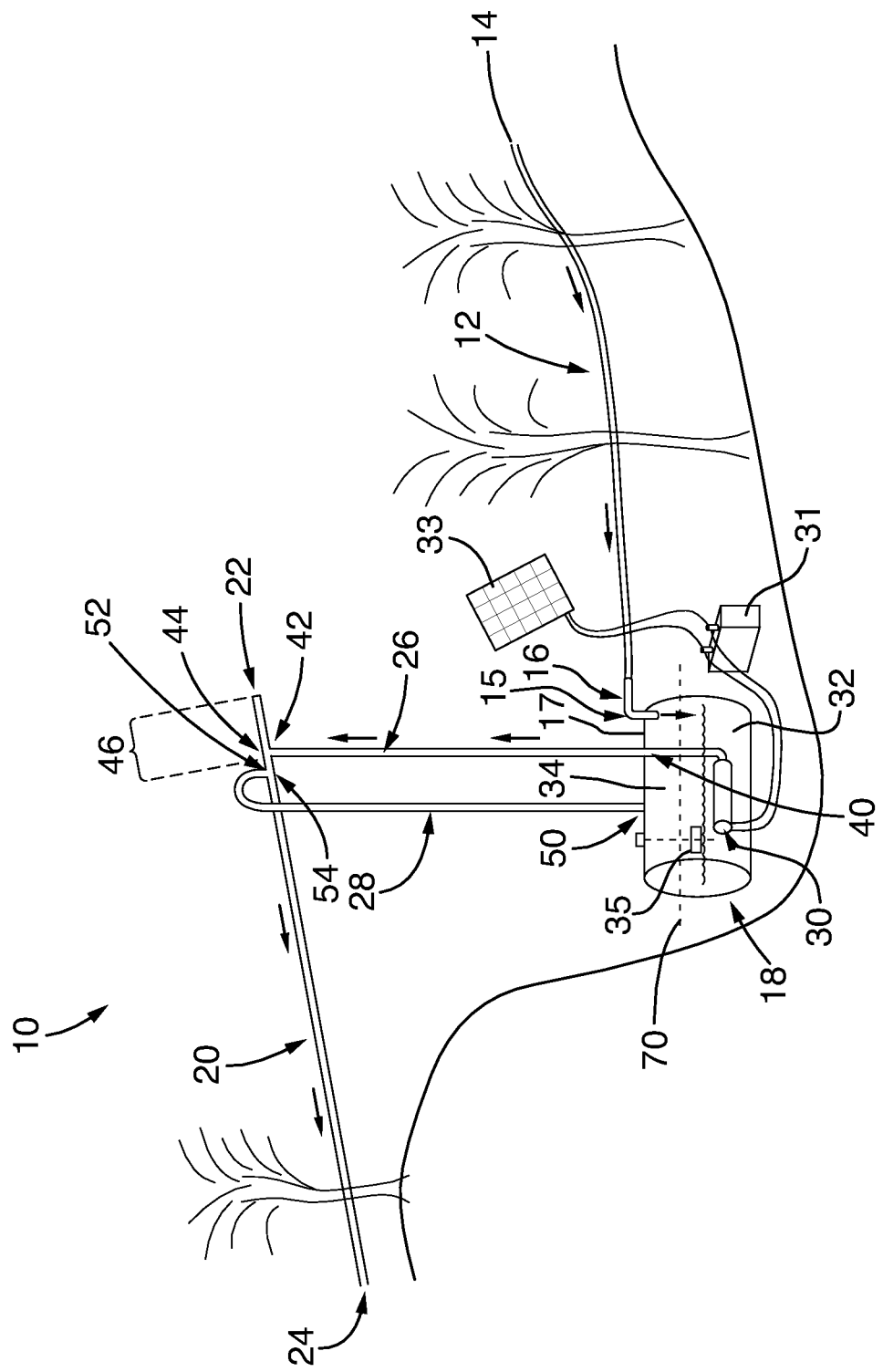
FIG. 2 shows a sap collection system in accordance with one embodiment of the present invention.
Figure 3:
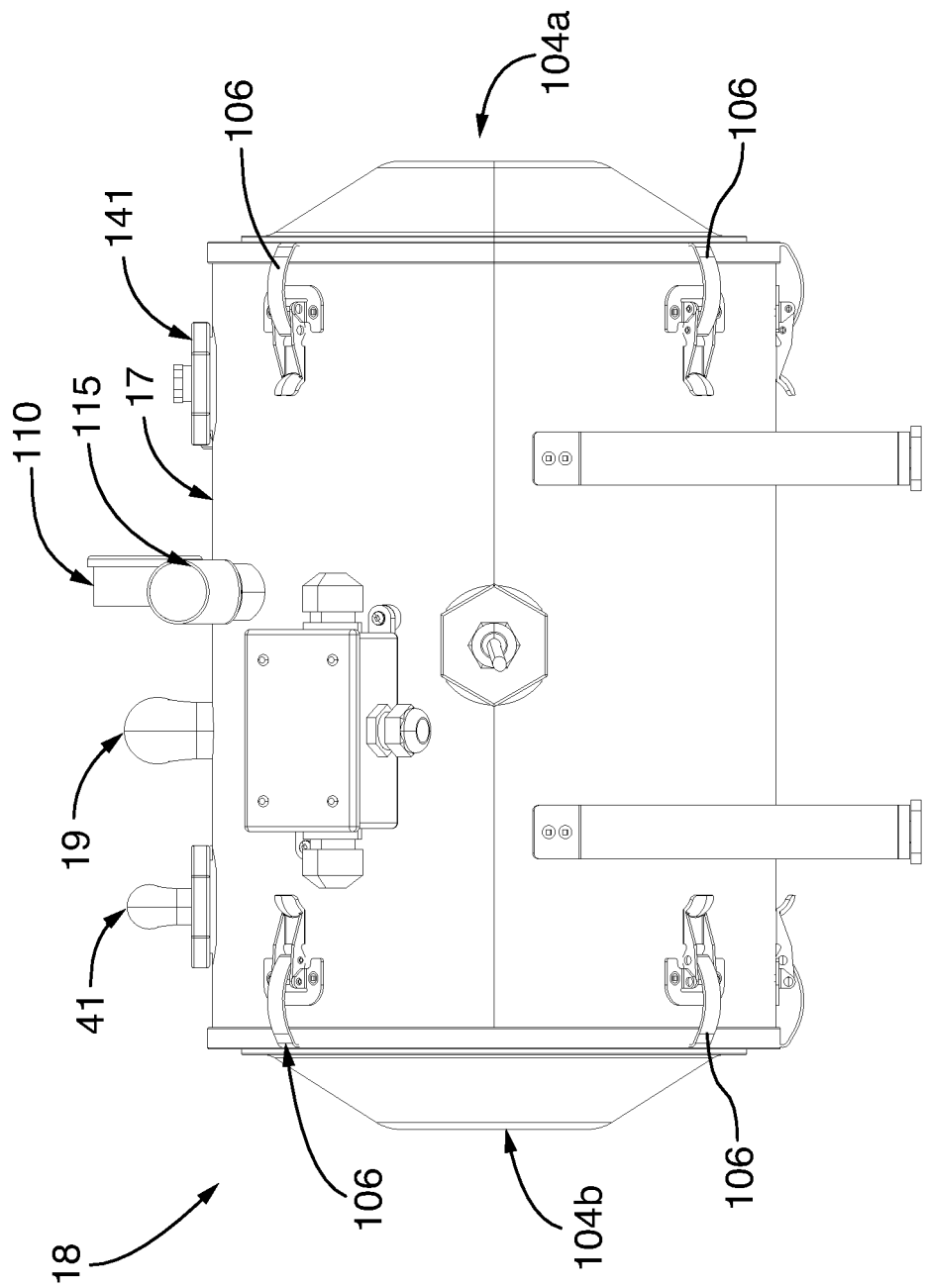
FIG. 3 is a front elevation view (photograph) of a sap lifter for use in connection with the sap collection system shown in FIG. 2, in accordance with one embodiment of the present invention.
Figure 4:
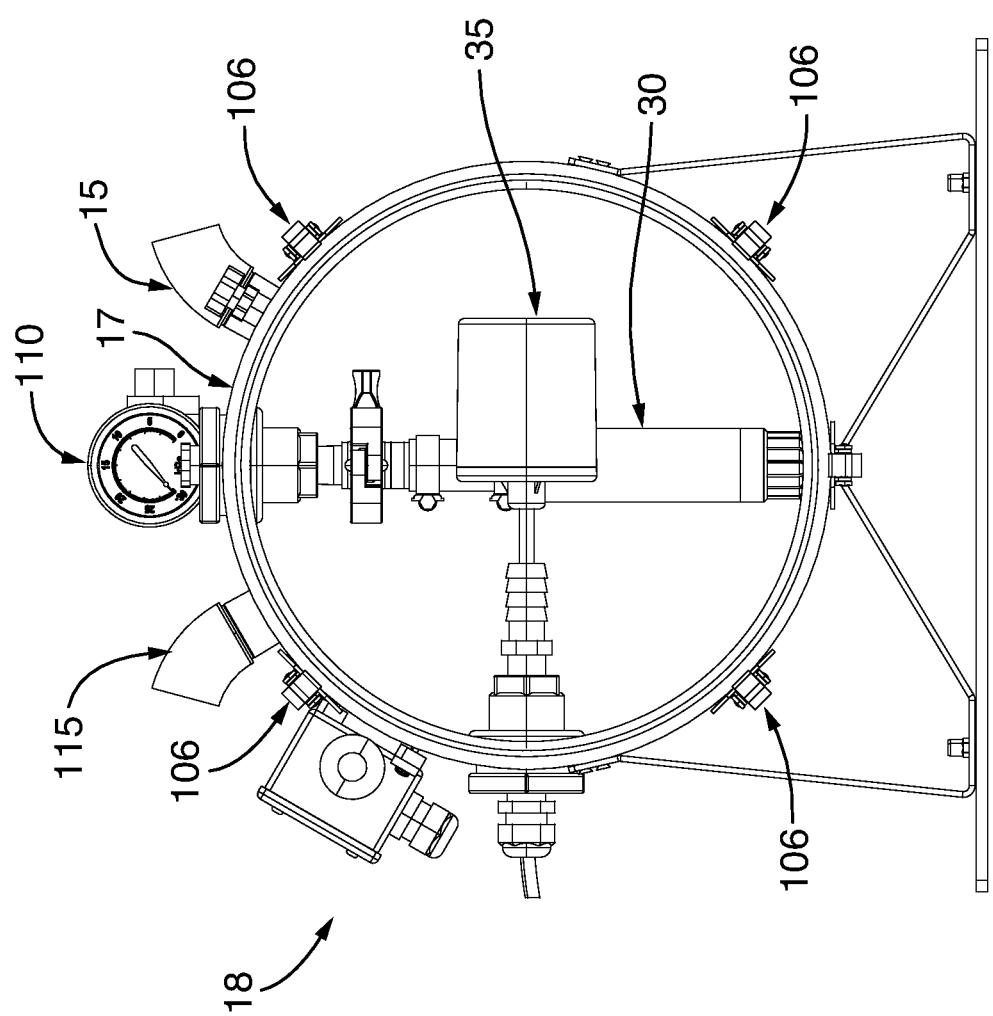
FIG. 4 is a left side view of the sap lifer shown in FIG. 3, with the removable covers removed for better showing the internal cavity and the submersible pump.
Figure 5:
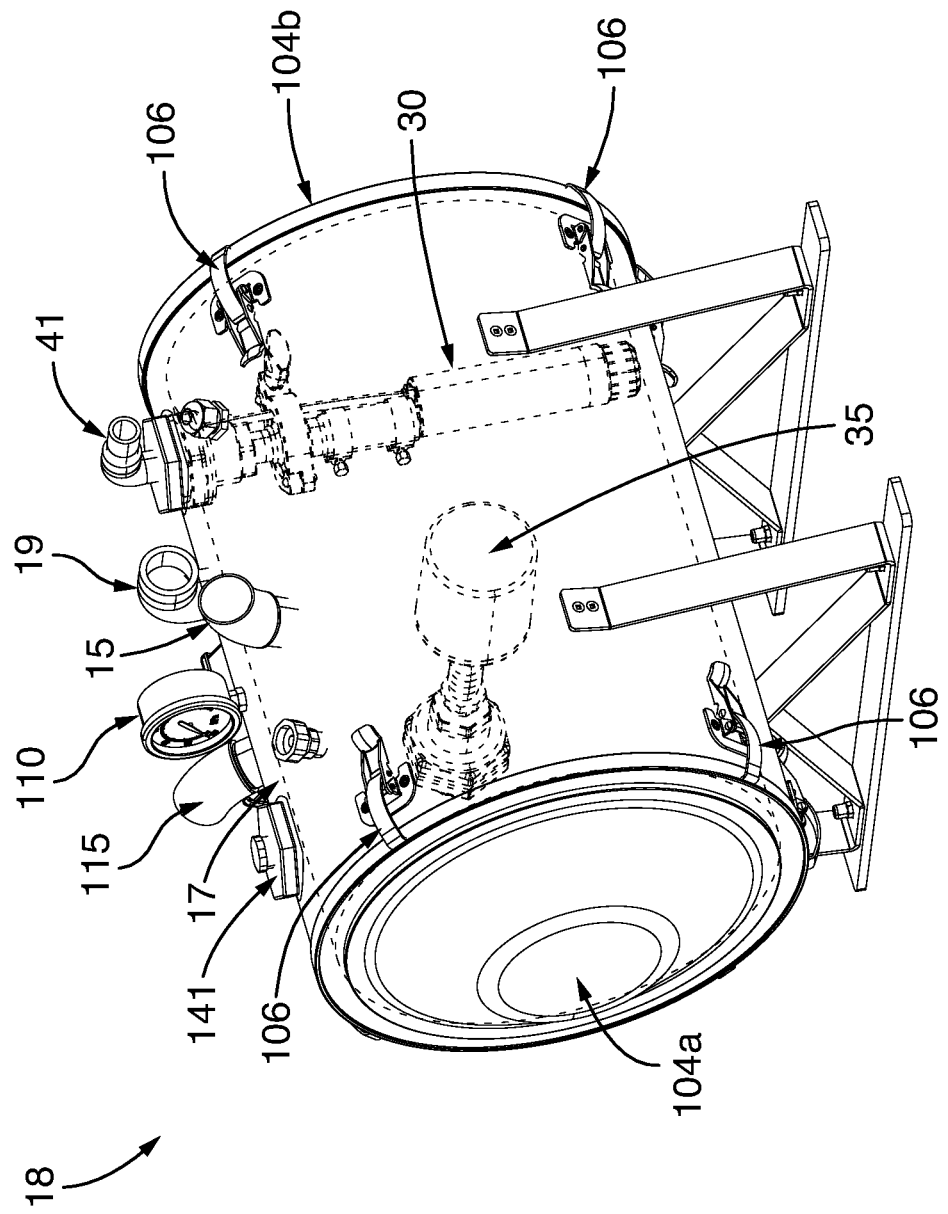
FIG. 5 is a right perspective view of the sap lifter shown in FIG. 3, showing the internal components thereof in dotted lines

With reference to FIG. 2, the collection system 10 comprises a first mainline portion 12 having an upstream end 14 fluidly connected to a plurality of maple trees (not shown) and a downstream end 16 fluidly and sealingly connected to an inlet 15 provided at top 17 of a sap lifter 18, as it will be described in greater details below. The collection system 10 also comprises a second mainline portion 20 having an upstream end 22 indirectly linked to an auxiliary outlet 19 of the sap lifter 18 and a downstream end 24 fluidly connected to the sugar shack (not shown) or another type of sap collection tank (also not shown) for ultimately conveying the maple sap to an evaporator or a reverse osmosis system (not shown). In one embodiment, the downstream end 24 of the second mainline portion 20 is also connected to a vacuum pump (not shown) creating a negative pressure in the second mainline portion 20 and other elements of the system 10, as it will become apparent below. While in this embodiment, the downstream end 24 is connected to a vacuum pump (not shown), it will be understood that the collection system need not to be under vacuum, and be operable with a system of pipes, tubes and/or mainline operable by way of gravity alone. Also, when the collection system 10 is operated under vacuum, the vacuum level can range from a very low vacuum level to a very high vacuum level, and will of course be adapted to the purpose of the collection system 10 and to the tolerance of the various components, as it would be known to the skilled person.

For connecting the upstream end 22 of the second tubing portion 20 to the sap lifter 18 are provided an upwardly extending sap ladder tube 26 operatively connected to a submersible pump 30 received in the sap lifter 18 and an auxiliary vacuum tube 28 sealingly connected to the auxiliary outlet 19 of the sap lifter 18. In one embodiment, the submersible pump 30 is an electric pump. To power the submersible pump 30, a battery 31 is provided, for instance a 6 volt battery, which battery 31 is operatively coupled to a solar panel system 33 allowing a recharge of the battery during daytime. To activate the submersible pump 30, a float switch 35 is provided. The use of the battery 31 and the solar panel system 33 advantageously allow powering the submersible pump 30 without having to route electric cables all through the sugar bush, which could prove to be expensive. In some embodiments however, the submersible pump 30 could be fed by an electric line, a gas or diesel powered generator or a wind turbine.

In the illustrated embodiment, and referring to FIGS. 2 to 5, the sap lifter 18 is a generally cylindrical and is sized so as to receive a volume of maple sap 32 from a portion of the sugar bush, without incurring risks of overflow. More specifically, the sap lifter 18 comprises a cylindrical body 100 defining an internal cylindrical cavity 102, and a pair of removable, disc-shaped covers 104a, 104b for closing the internal cavity 102. To maintain the removable covers 104a and 104b in position, and ensuring that the cavity 102 of the sap lifter 18 is sealingly closed and causes no vacuum leaks, clamps 106 and seals 108 are provided. A gauge 110 is mounted to the top 17 of the sap lifter 18 to monitor the vacuum pressure in the system 10, and more particularly in the sap lifter 18.

As best shown in FIG. 2, the volume of maple sap 32 is housed in the sap lifter 18 so as not to exceed a maximum level 70, thus providing an air space 34 on the top portion of the sap lifter 18. The downstream end 16 of the first mainline portion 12 being sealingly mounted to the top 17 of the sap lifter 18, and being spaced-apart from the maximum maple sap level 70 contained in the sap lifter 18, it allows a vacuum flow created in the air space 34 to be maintained in the first mainline portion 12 while allowing maple sap conveyed in the first mainline portion 12 to drop in the sap lifter 18, as it will be described in greater details below.

For conveying the maple sap from the sap lifter 18 to the second mainline portion 20, the submersible pump 30 received in the sap lifter 18 is operatively connected to a first end 40 of the sap lifter tube 26, which first end 40 is sealingly connected to an outlet 41, while a second end 42 of the sap feeding tube 26 is fluidly connected to the second mainline portion 20 at a first connection point 44. As best shown in FIG. 2, the first connection point 44 is located at an intermediate location between the upstream end 22 and the downstream end 24 (although relatively close to the upstream end 22) to leave a small tube section 46 between the first connection point 44 and the upstream end 22 of the second mainline portion, 20.

Like the sap ladder tube 26, the auxiliary feeding tube 28 extends between the sap lifter 18 and the second mainline portion 20. More specifically, the auxiliary vacuum tube 28 comprises a lower end 50 sealingly mounted to the auxiliary outlet 19 provided at the top 17 of the sap lifter 18, spaced-apart from the maximum level 70 of the volume of maple sap contained in the tanks. The auxiliary vacuum tube 28 also comprises an upper end 52 fluidly connected to the second mainline portion 20, at a second connection point 54. As shown in FIG. 2, the second connection point 54 is slightly downstream the first connection point 44. As such, the second connection point 54 is positioned slightly lower than the first connection point 44 relative to the upstream end 22 of the second mainline portion 20, to allow a flow of maple sap from the upstream end 22 towards the downstream end 24 by gravity. Alternatively, the second connection point 54 could be located between the first connection point 44 and the upstream end 22 of the second mainline portion 20. As such, the second connection point 54 would be positioned upstream and higher than the first connection point 44, as the upstream end 22 of the second mainline portion 20 is positioned higher than the downstream end 24, to allow a flow of maple sap from the upstream end 22 towards the downstream end 24 by gravity.

In operation, the vacuum pump (not shown) connected to the downstream end 24 of the second mainline portion 20 draws a negative pressure in the second mainline portion 20. As the auxiliary vacuum tube 28 is sealingly connected to the second connection point 54 and to the auxiliary outlet 19 at the top 17 of the sap lifter 18, the negative pressure created by the vacuum pump (not shown) creates a corresponding negative pressure in the air space 34 of the sap lifter 18, without however tending to draw the maple sap contained therein. The negative pressure created in the air space 34 in turn draws a negative pressure in the first mainline portion 12, thus causing maple sap expelled from maple trees to enter the upstream end 14 of the first mainline portion 12 (via tubing, not shown), and to be conveyed towards the downstream end 16 of the first mainline portion 12, to then enter the sap lifter 18 to be collected. Once a proper level of maple sap is accumulated in the sap lifter 18, the float switch 35 activates the submersible pump 30. Therefore, the maple sap contained in the sap lifter 18 is pumped towards the sap ladder tube 26 to then enter the second mainline portion 20, via the first connecting point 44. As the first connecting point 44 is located downstream and lower than the second connection point 54, the maple sap entering the second mainline portion 20 will flow towards the downstream end 24 by gravity (and vacuum) rather than being prompted to enter the second connection point 54. The maple sap then flows through the second mainline portion 20 to be ultimately collected in a collection tank or evaporator, as the case may be. When no vacuum pump is used, the system 10 relies mainly on gravity acting on the sap contained in first mainline portion 12 (to the sap lifter 18) and the second mainline portion 20, (received from the sap lifter 18).

As it will be appreciated, the tubing network (i.e. the first and second mainline portions 12, 20, the sap lifter 18, the sap feeding tube 26 and the auxiliary vacuum tube 28) create a closed-circuit vacuum system avoiding vacuum leaks. As such, the system 10, and the configuration of the sap lifter 18, contribute to reduce vacuum leak and thus icing that can occur as a result of the venture effect. Furthermore, the fact that the submersible pump 30 is connected to a battery 31 and/or solar panel system 33 alleviate the need to run expensive electric lines in the sugar bush.

The embodiments described above are intended to be exemplary only. The scope of the invention is therefore intended to be limited solely by the appended claims.

While in the present embodiment, the sap lifter 18 is represented with a horizontally extending body, it will be understood that it could be configured differently. For instance, the sap lifter 18 could be vertically extending. Furthermore, while the sap lifter 18 is shown as having a generally cylindrical body, it will be understood that other shapes would also be suitable. For instance, the sap lifter 18 could have the shape of a rectangular prism, a cube or any other shape.

Furthermore, while in the illustrated embodiment, the sap lifter 18 is shown with two removable covers 104*a*, 104*b* removably mounted at the ends of the body 100, the sap lifter 18 could be provided with only one removable cover, or no removable cover. Further, the removable cover could be positioned elsewhere on the sap lifter 18, for instance on the top 17 of the sap lifter. Also, while clamps 106 are used, it will be appreciated that other configurations are possible for removably fastening covers to the body 100. For instance, the covers could be secured using threaded fasteners such as screws, or the cover itself could be provided with a threaded portion engaging a corresponding threaded portion on the body 100 of the sap lifter 18, thus allowing screwing the cover to the body 100.

While in the illustrated embodiment, the sap lifter 18 is described as using a submersible pump 30 activated by a float switch 35, it will be understood that it could be configured differently without departing from the scope of the embodiment. For instance, submersible pump 30 could be replaced by a vertical pump or any other suitable pump, mounted to the top 17 of the sap lifter 18 (either inside or outside the body 100) and equipped with an inlet pipe sealingly mounted to the body 100 of the sap lifter and extending in the cavity 102, so as to be immersed when the sap lifter 18 contains an appropriate level of sap. Further, while in the embodiment described the pump 30 is an electric pump is an electric pump, it will be understood that it could be a gas or diesel pump. Furthermore, the operation of the submersible pump 30 (or another suitable type of pump) could be triggered by means other than a float switch. For instance, an optical level detector or a conductivity detector could be used. Alternatively, the operation of the pump 30 could be triggered by a timer switch or manually by an operator.

Further, while in the illustrated embodiment the system 10 is shown with one pump 30, one inlet 15 for connecting a corresponding first mainline portion and one auxiliary outlet 19 for creating vacuum in the sap lifter 18, it will be understood that the number of inlets, auxiliary outlets and pumps, and the permutations thereof could vary depending on the size of the sap lifter 18 and/or on the flow of sap received therein, without departing from the scope of the embodiments. For instance, in some embodiments, it may be desirable to provide the sap lifter 18 with two or more pumps (e.g. one pump being associated with outlet 41 and a second pump associated with a second outlet 141 shown in FIGS. 3 to 5), with two or more inlets for receiving the sap (e.g. inlet 15 and a second inlet 115 shown in FIGS. 3 to 5), and/or with two or more auxiliary outlets (e.g. auxiliary outlet 19) operatively connected to a corresponding number of auxiliary tubes for creating vacuum in the system. Further, the system 10 can be provided with various outlets and inlets, some of which being selectable and usable depending on the requirements and needs, the non-used outlets and/or inlets being sealingly closed using plugs, sealed covers or the like.

The embodiments described above are intended to be exemplary only. The scope of the invention is therefore intended to be limited solely by the appended claims.

The invention claimed is:

1. A sap lifter for a sap collection system, the system comprising a vacuum pump and a plurality of pipes in fluid communication with the sap lifter and the vacuum pump, the sap lifter and the plurality of pipes being subjected to a level of constant vacuum, the sap lifter comprising:
    a body defining an internal cavity for receiving a volume of sap;
    an inlet for sealingly connecting the body to a downstream end of a first mainline portion of the plurality of pipes, the first mainline portion comprising a first pipe comprising a first end extending into the internal cavity of the body, the first mainline portion being adapted to convey sap towards the sap lifter;
    a first outlet for sealingly connecting the body to a second pipe comprising a first end extending from the internal cavity to outside the body, and a second end being connectable to an upstream end portion of a second mainline portion of the plurality of pipes, the second mainline portion comprising the upstream end portion and a downstream end portion and being adapted to convey the sap away from the sap lifter; and
    a pump operatively coupled to the first end of the second pipe for pumping sap away from the sap lifter, wherein the pump is adapted to pump the sap from the first end of the second pipe once a maximum level of sap is reached in the body, and
    wherein the maximum level of sap is set to leave an air space in the body and in the plurality of pipes for maintaining the level of constant vacuum in the sap lifter and in the plurality of pipes.

2. The sap lifter of claim 1, wherein the number of the plurality of pipes is determined according to the volume of sap or to the level of constant vacuum.

3. The sap lifter of claim 1, wherein the maximum level of sap is determined according to the level of constant vacuum.

4. The sap lifter of claim 1, wherein the level of constant vacuum is a low vacuum or a high vacuum.

5. The sap lifter of claim 1, comprising a second outlet for sealingly connecting the body to a third pipe of the plurality of pipes, the third pipe connecting the body to the upstream end portion of a second mainline portion, wherein a diameter of the second outlet and/or a diameter of the third pipe are determined according to the level of constant vacuum.

6. The sap lifter of claim 1, comprising a cover mounted to the body.

7. The sap lifter of claim 1, wherein the sap lifter and the plurality of pipes define a closed-circuit with no fluid communication with ambient air for maintaining the level of constant vacuum in the sap lifter and in the plurality of pipes.

8. The sap lifter of claim 7, wherein the closed-circuit is adapted to prevent vacuum leaks.

9. The sap lifter of claim 1, wherein the pump is a submersible pump.

10. A sap lifter for a sap collection system, the system comprising a vacuum pump and a plurality of pipes in fluid communication with the sap lifter and the vacuum pump, the sap lifter and the plurality of pipes being subjected to a level of constant vacuum, the sap lifter comprising:
    a body defining an internal cavity for receiving a volume of sap;
    an inlet for sealingly connecting the body to a downstream end of a first mainline portion of the plurality of pipes, the first mainline portion comprising a first pipe comprising a first end extending into the internal cavity of the body, the first mainline portion being adapted to convey sap towards the sap lifter;
    a first outlet for sealingly connecting the body to a second pipe comprising a first end extending from the internal cavity to outside the body, and a second end being connectable to an upstream end portion of a second mainline portion of the plurality of pipes, the second mainline portion comprising the upstream end portion and a downstream end portion and being adapted to convey the sap away from the sap lifter; and
    a pump operatively coupled to the first end of the second pipe for pumping sap away from the sap lifter, wherein the pump is adapted to pump the sap from the first end of the second pipe once a maximum level of sap is reached in the body,
    wherein the sap lifter and the plurality of pipes define a closed-circuit with no fluid communication with ambient air for maintaining the level of constant vacuum in the sap lifter and in the plurality of pipes.

11. The sap lifter of claim 10, wherein the closed-circuit is adapted to prevent vacuum leaks.

12. The sap lifter of claim 10, wherein the maximum level of sap is set to leave an air space in the body and in the plurality of pipes for maintaining the level of constant vacuum in the sap lifter and in the plurality of pipes.

13. The sap lifter of claim 10, wherein the number of the plurality of pipes is determined according to the volume of sap or to the level of constant vacuum.

14. The sap lifter of claim 10, wherein the maximum level of sap is determined according to the level of constant vacuum.

15. The sap lifter of claim 10, wherein the level of constant vacuum is a low vacuum or a high vacuum.

16. The sap lifter of claim 10, comprising a second outlet for sealingly connecting the body to a third pipe of the plurality of pipes, the third pipe connecting the body to the upstream end portion of a second mainline portion, wherein a diameter of the second outlet and/or a diameter of the third pipe are determined according to the level of constant vacuum.

17. The sap lifter of claim 10, comprising a removable cover mounted to the body.

18. The sap lifter of claim 17, wherein the removable cover is secured to the body with a clamp.

19. The sap lifter of claim 17, comprising a seal located between the removable cover and the body when the removable cover is mounted to the body.

20. The sap lifter of claim 10, wherein the pump is a submersible pump.

* * * * *